(12) United States Patent
Li et al.

(10) Patent No.: US 12,200,496 B2
(45) Date of Patent: Jan. 14, 2025

(54) PROFILE TRANSFER WITH SECURE INTENT

(71) Applicant: Apple Inc., Cupertino, CA (US)

(72) Inventors: Li Li, Los Altos, CA (US);
Mohanasundaram Kattavoor Sivakumar, Mountain View, CA (US);
Dennis D. Conway, Campbell, CA (US); Zexing Shi, San Jose, CA (US);
Aurelien P. Raboisson, Torrance, CA (US); Ngabin S. Ng, Rowland Heights, CA (US); Rajeev Verma, San Jose, CA (US); Raj S. Chaugule, Santa Clara, CA (US); Keizo Marui, New Dundee (CA); Lukas M. Bugla, Fremont, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 465 days.

(21) Appl. No.: 17/656,218

(22) Filed: Mar. 23, 2022

(65) Prior Publication Data
US 2023/0319573 A1    Oct. 5, 2023

(51) Int. Cl.
*H04L 29/06*     (2006.01)
*H04W 12/041*    (2021.01)
*H04W 12/06*     (2021.01)
*H04W 12/40*     (2021.01)

(52) U.S. Cl.
CPC ......... *H04W 12/40* (2021.01); *H04W 12/041* (2021.01); *H04W 12/06* (2013.01)

(58) Field of Classification Search
CPC .... H04W 12/041; H04W 12/06; H04W 12/40
See application file for complete search history.

(56) References Cited

U.S. PATENT DOCUMENTS

2019/0387402 A1* 12/2019 Li ............................ H04L 41/28
2021/0152345 A1* 5/2021 Beloskur ............... H04L 9/0844

* cited by examiner

*Primary Examiner* — Rodman Alexander Mahmoudi
(74) *Attorney, Agent, or Firm* — DICKINSON WRIGHT RLLP

(57) ABSTRACT

Embodiments are described herein for transferring a subscriber identity module (SIM) or electronic SIM (eSIM) profile securely from a source device to a target device with verifiable signatures generated by secure hardware elements of the source device contingent on receipt of a secure intent gesture. Trustworthiness of the profile transfer is based on a mobile network operator (MNO) entitlement server releasing a transfer token after verification of a message signed by an embedded universal integrated circuit card (eUICC) of the source device. The eUICC signs the message only after verifying a message from a secure enclave processor (SEP) of the source device that signs the message based on receipt of the secure intent gesture via a secure interface. To validate communication between the SEP and the eUICC, an asymmetric cryptographic key pair generated by the SEP is bound to a unique eUICC identifier (EID) value of the eUICC.

20 Claims, 11 Drawing Sheets

PROFILE TRANSFER WITH SECURE INTENT

FIELD

The described embodiments relate to wireless communications, including methods and apparatus for transferring a profile securely from a source device to a target device with verifiable signatures generated by secure hardware elements of the source device contingent on receipt of a secure intent gesture.

BACKGROUND

Newer generation, fifth generation (5G), cellular wireless networks that implement one or more $3^{rd}$ Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Wireless local area networks, such as Wi-Fi networks, additionally provide access to communication network services, including cellular based services, such as Wi-Fi calling. Access to cellular services provided by an MNO, including access via a non-cellular wireless network such as Wi-Fi, by a wireless device can require access to cellular credentials and secure processing provided by a removable universal integrated circuit card (UICC), also referred to as a physical subscriber identity module (pSIM) card, and/or an embedded UICC (eUICC) included in the wireless device.

Typically, wireless devices have been configured to use removable UICCs that provide access to services of an MNO. In particular, each UICC includes at least a microprocessor and a read-only memory (ROM), where the ROM is configured to store an MNO profile, also referred to as a SIM or a SIM profile, which the wireless device can use to register and interact with an MNO to obtain wireless services via a cellular wireless network. The SIM profile hosts subscriber data, such as a digital identity and one or more cryptographic keys, to allow the wireless device to communicate with a cellular wireless network. A UICC takes the form of a small removable card that can be inserted into a UICC-receiving bay of a mobile wireless device. In more recent implementations, UICCs are embedded directly into system boards of wireless devices as eUICCs, which provide advantages over traditional, removable UICCs. The eUICCs include a rewritable memory that can facilitate installation, modification, and/or deletion of one or more electronic SIMs (eSIMs) on the eUICC, where the eSIMs can provide for new and/or different services and/or updates for accessing extended features provided by MNOs.

A user can transfer cellular service accounts associated with one or more SIMs and/or eSIMs between different wireless devices, such as when switching between wireless devices to use or when configuring a new wireless device to replace or supplement an older wireless device. Secure transfer of cellular wireless credentials is paramount to avoid unauthorized transfer and use of the cellular wireless credentials. There exists a need for secure verification for transfer of cellular wireless credentials between wireless devices.

SUMMARY

The described embodiments relate to wireless communications, including methods and apparatus for transferring a subscriber identity module (SIM) or electronic SIM (eSIM) profile securely from a source device to a target device with verifiable signatures generated by secure hardware elements of the source device contingent on receipt of a secure intent gesture. Trustworthiness of the profile transfer is based on a mobile network operator (MNO) entitlement server releasing a transfer token after verification of a message signed by an embedded universal integrated circuit card (eUICC) of the source device. The eUICC signs the message only after verifying a message from a secure enclave processor (SEP) of the source device that signs the message based on receipt of a secure intent gesture via a secure interface of the source device. To secure communication between the SEP and the eUICC of the source device, an asymmetric cryptographic key pair generated by the SEP is bound to a unique eUICC identifier (EID) value of the eUICC of the source device.

To protect against malicious software installed on an application processor (AP) of a wireless device from acquiring an MNO-provided transfer token to transfer a profile surreptitiously from a source device to an attacker's device, the source device requires confirmation of a user's intent to transfer the profile via a secure hardware-based input and cryptographic processing by multiple hardware elements of the source device to verify security before requesting release of the transfer token from an MNO entitlement server. A chain of trust is established from the MNO entitlement server to an eUICC of the source device to a secure enclave processor (SEP) of the source device that detects securely a user's intent to transfer the profile. Authentication using profile credentials of the source device, such as via an extensible authentication protocol (EAP) authentication and key agreement (AKA) procedure alone is insufficient to authorize transfer of a profile. To initiate a profile transfer, the source device obtains from the MNO entitlement server a one-time use transfer nonce and includes the transfer nonce with authentication challenge parameters and responses in messages communicated among processing elements of the source device and with the MNO entitlement server. To confirm a user's intent to transfer a profile, a secure enclave processor (SEP) of the source device receives, via a hard-wired connection between an input mechanism and the SEP, a secure intent gesture. In some embodiments, the secure intent gesture includes multiple, sequential presses of a physical button of the source device. After detection of the secure intent gesture, the SEP generates a signature, using an SEP private key ($SK_{SEP}$) of a previously generated SEP asymmetric key pair, and attaches the signature to a message sent to the eUICC via the AP and a baseband component of the source device. The corresponding SEP public key ($PK_{SEP}$) of the SEP asymmetric key pair is tied to the unique eUICC identifier (EID) of the eUICC of the source device. The eUICC receives, from the baseband component, the forwarded, signed SEP message along with an attestation data message that includes $PK_{SEP}$, and verifies the SEP-generated signature accompanying the SEP message. After successful verification of the SEP signature, the eUICC uses an eUICC private key ($SK_{eUICC}$) to generate a signature to accompany a transfer authorization request message sent to the MNO entitlement server. The MNO entitlement server validates the eUICC-generated signature using a trusted eUICC certificate chained to a trusted GSMA root certificate. After successful validation, the MNO entitlement server sends a transfer token to the source device to use for transferring the profile from the source device to the target device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
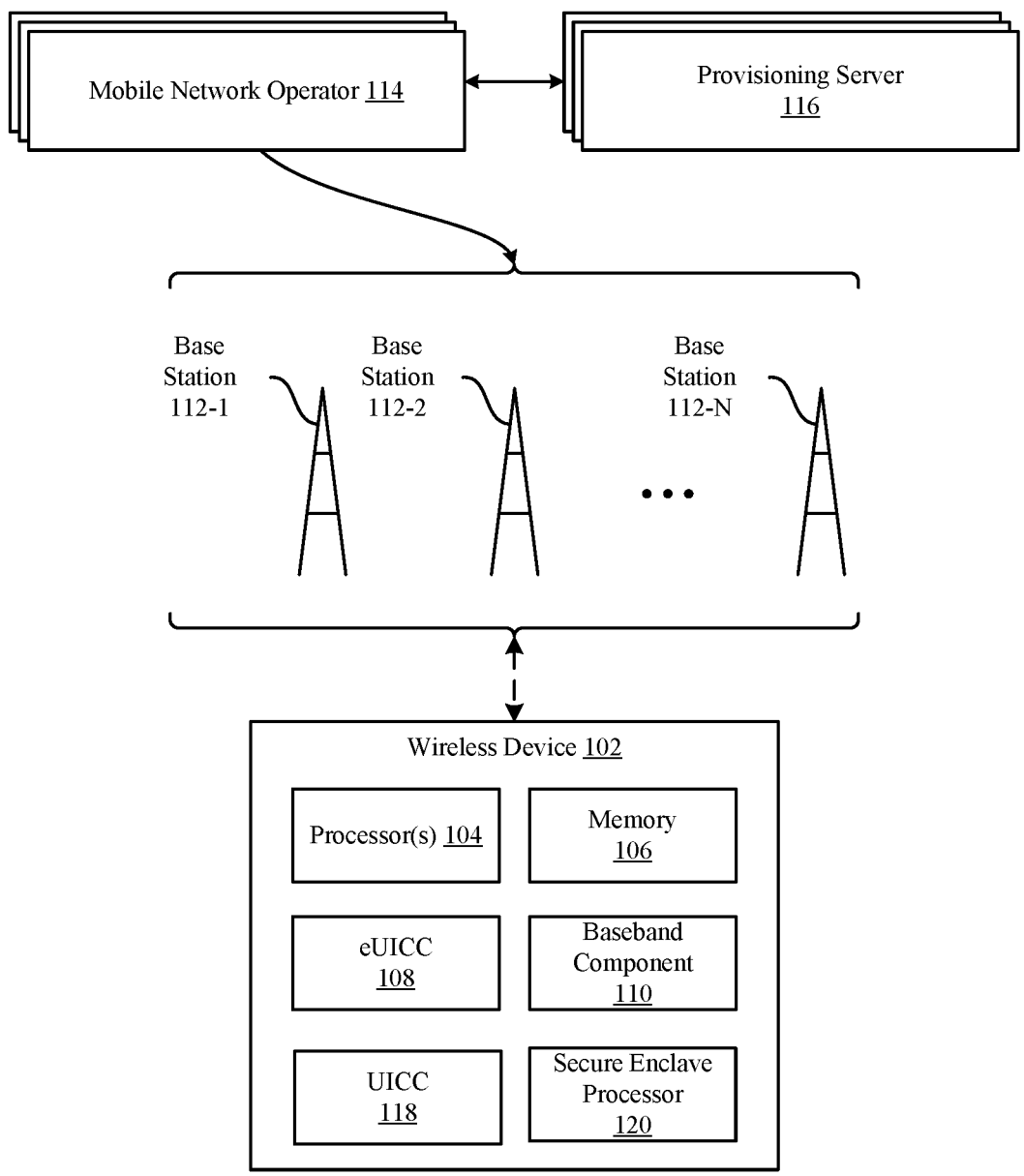
FIG. 1 illustrates a block diagram of different components of an exemplary system configured to implement cellular service access and provisioning for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The described embodiments relate to wireless communications, including methods and apparatus for transferring a subscriber identity module (SIM) or electronic SIM (eSIM) profile securely from a source device to a target device with verifiable signatures generated by secure hardware elements of the source device contingent on receipt of a secure intent gesture. Trustworthiness of the profile transfer is based on a mobile network operator (MNO) entitlement server releasing a transfer token after verification of a message signed by an embedded universal integrated circuit card (eUICC) of the source device. The eUICC signs the message only after verifying a message from a secure enclave processor (SEP) of the source device that signs the message based on receipt of a secure intent gesture via a secure interface of the source device. To secure communication between the SEP and the eUICC of the source device, an asymmetric cryptographic key pair generated by the SEP is bound to a unique eUICC identifier (EID) value of the eUICC of the source device.

To protect against malicious software installed on an application processor (AP) of a wireless device from acquiring an MNO-provided transfer token to transfer a profile surreptitiously from a source device to an attacker's device, the source device requires confirmation of a user's intent to transfer the profile via a secure hardware-based input and cryptographic processing by multiple hardware elements of the source device to verify security before requesting release of the transfer token from an MNO entitlement server. A chain of trust is established from the MNO entitlement server to an eUICC of the source device to a secure enclave processor (SEP) of the source device that detects securely a user's intent to transfer the profile. The MNO entitlement server validates, using an eUICC certificate chained to a GSMA root certificate trusted by the MNO entitlement server, an eUICC signature accompanying a transfer authorization request message to acquire a transfer token from the entitlement server to transfer a pSIM profile or an eSIM profile from the source device to a target device. Authentication of the source device using profile credentials of the source device, such as via an extensible authentication protocol (EAP) authentication and key agreement (AKA) procedure alone, is insufficient to authorize transfer of a profile. The eUICC generates the eUICC signature accompanying the transfer authorization request message sent to the MNO entitlement server only after verifying, using a previously obtained SEP public key ($PK_{SEP}$) bound to the EID of the eUICC, an SEP signature accompanying a message received from the SEP of the source device. The SEP generates the SEP signature only after detecting a secure intent gesture received securely via a hard-wired input of the source device indicating a user's intent to transfer the profile from the source device to the target device. Malware on the AP of the source device cannot intercept or imitate the secure intent gesture to the SEP.

To initiate a profile transfer, the source device sends to the MNO entitlement server an authentication request message and receives from the MNO entitlement server a one-time use transfer nonce along with authentication challenge parameters. The transfer nonce is included in messages communicated among processing elements of the source device and subsequent messages sent to the MNO entitlement server to obtain a transfer token to transfer a profile. To confirm a user's intent to transfer a profile, a secure enclave processor (SEP) of the source device obtains, via a hardwired connection between an input mechanism of the source device and the SEP, a secure intent gesture. In some embodiments, the secure intent gesture includes multiple, sequential presses of a physical button of the source device. In some embodiments, the secure intent gesture further includes successful entry and verification of a passcode of the source device. In some embodiments, the secure intent gesture additionally or alternatively includes a biometric scan, such as a fingerprint, iris, or face detection. After detection of the secure intent gesture, the SEP generates a signature, using an SEP private key ($SK_{SEP}$) of an SEP asymmetric key pair, and attaches the signature to a message sent to a baseband component of the source device to forward to the eUICC. In some embodiments, the SEP generates the SEP asymmetric key pair prior to initiating transfer of the profile and provides the SEP public key ($PK_{SEP}$) of the SEP asymmetric key pair along with a unique eUICC identifier (EID) of the eUICC of the source device to a network-based device services server to bind the $PK_{SEP}$ and the EID together in an attestation data message returned by the network-based device services server to the source device for secure storage and later retrieval to use during a profile transfer procedure.

The baseband component receives the signed SEP message along with the attestation data from the AP of the source device. The baseband component uses the authentication challenge parameters to obtain authentication challenge response parameters from the eUICC, in the case of an eSIM transfer, or from the UICC, in the case of a pSIM transfer. Subsequently, the eUICC, receives from the baseband component the signed SEP message with the attestation data. The eUICC extracts the $PK_{SEP}$ from the attestation data and uses the $PK_{SEP}$ to verify the signature accompanying the SEP message. The eUICC, after successful verification, uses an eUICC private key ($SK_{eUICC}$) to generate a signature to accompany a transfer authorization request message sent to the MNO entitlement server via the baseband component and the AP of the source device. The MNO entitlement server validates the eUICC-generated signature using a trusted eUICC certificate chained to a trusted GSMA root certificate. The MNO entitlement server performs additional verification of data included with the transfer authorization request, such as an ICCID value and a SIM type (pSIM or eSIM) of the profile to be transferred, one or more hardware identifiers of the source device, validation of the authentication challenge response parameters, etc. After successful validation, the MNO entitlement server generates and sends a transfer token to the source device to use for transferring the profile from the source device to the target device.

These and other embodiments are discussed below with reference to FIGS. 1 through 9; however, those skilled in the art will readily appreciate that the detailed description given herein with respect to these figures is for explanatory purposes only and should not be construed as limiting.

FIG. 1 illustrates a block diagram of different components of a system 100 that includes i) a wireless device 102, which can also be referred to as a mobile wireless device, a cellular wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs), fifth generation (5G) NodeBs (gNodeBs or gNBs), and/or sixth generation (6G) NodeBs that are configured to communicate with the wireless device 102, and the MNOs 114 can represent different wireless service providers that provide specific services (e.g., voice, data, video, messaging) to which a user of the wireless device 102 can subscribe to access the services via the wireless device 102. Applications resident on the wireless device 102 can advantageously access services using 4G LTE connections, 5G connections, and/or 6G connections (when available) via the base stations 112. The wireless device 102 can include processing circuitry, which can include one or more processors 104, such as an application processor (AP), and a memory 106, an embedded Universal Integrated Circuit Card (eUICC) 108, a baseband component 110 for baseband wireless processing, and a secure enclave processor (SEP) for additional secure processing. In some embodiments, the wireless device 102 can include one or more universal integrated circuit cards (UICCs) 118, also referred to as physical SIM cards, each UICC 118 including a SIM, in addition to or in place of the eUICC 108 providing one or more electronic SIMs (eSIMs). The one or more processors 104 can include one or more wireless processors, such as a cellular processor, a wireless local area network processor, a wireless personal area network processor, a near-field communication processor, and one or more system-level application processors. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple eSIMs for accessing services offered by one or more different MNOs 114 via communication through base stations 112-1 to 112-N. To be able to access services provided by the MNOs 114, one or more eSIMs can be provisioned to the eUICC 108 of the wireless device 102. The wireless device 102 can include wireless circuitry, including the baseband component 110 and at least one transmitter/receiver, also referred to as a transceiver. A user of the wireless device 102 can seek to transfer cellular wireless service credentials authorizing access to services of an MNO 114 to another wireless device 102.

Figure 2:
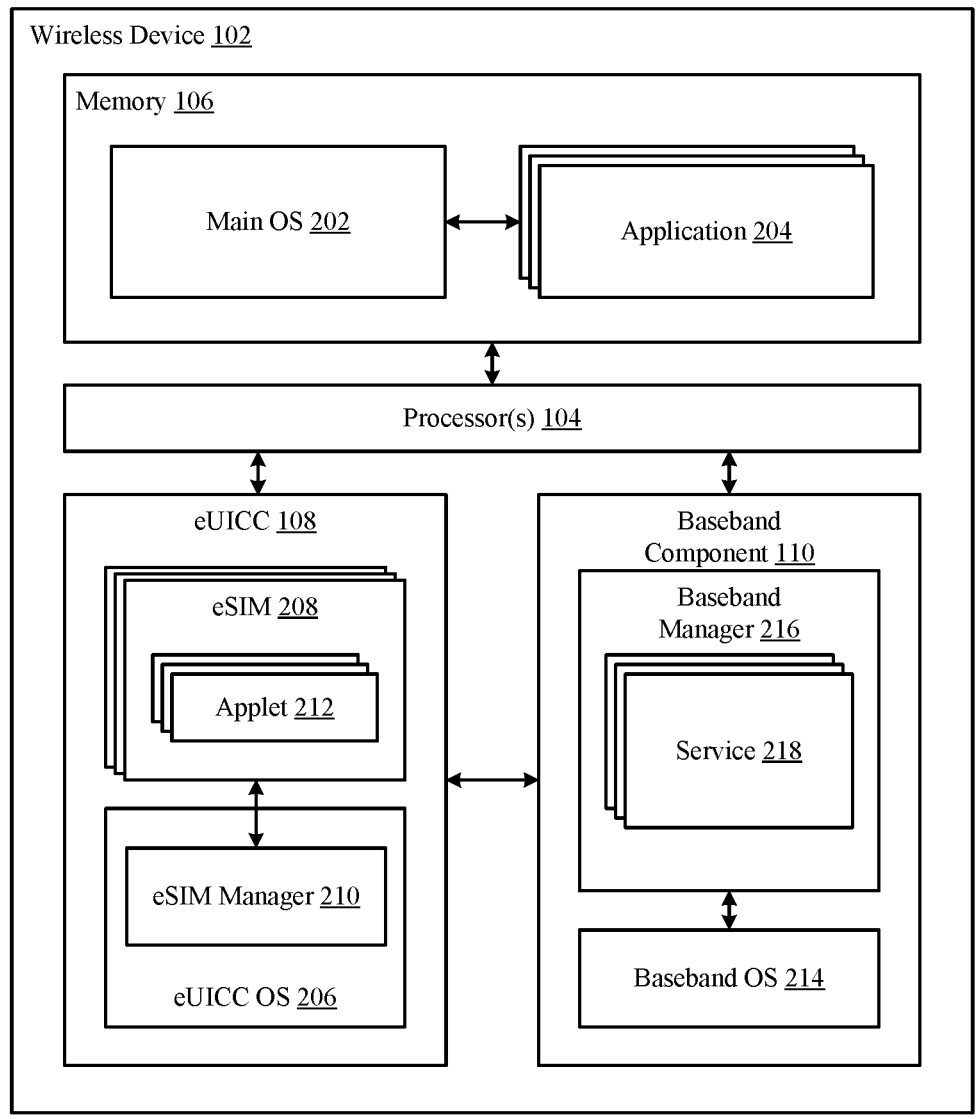
FIG. 2 illustrates a block diagram of a more detailed view of exemplary components of a mobile wireless device of the system of FIG. 1, according to some embodiments.

FIG. 2 illustrates a block diagram 200 of a more detailed view of exemplary components of a wireless device 102 of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the wireless device 102, e.g., reduced power modes, as well as of the wireless device 102 as a whole, e.g., mobility states, activity/inactivity states. The wireless device 102 includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the wireless device 102 to communicate with an MNO 114 and provide useful features (e.g., phone calls and internet) to a user of the wireless device 102.

A baseband component 110 of the wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
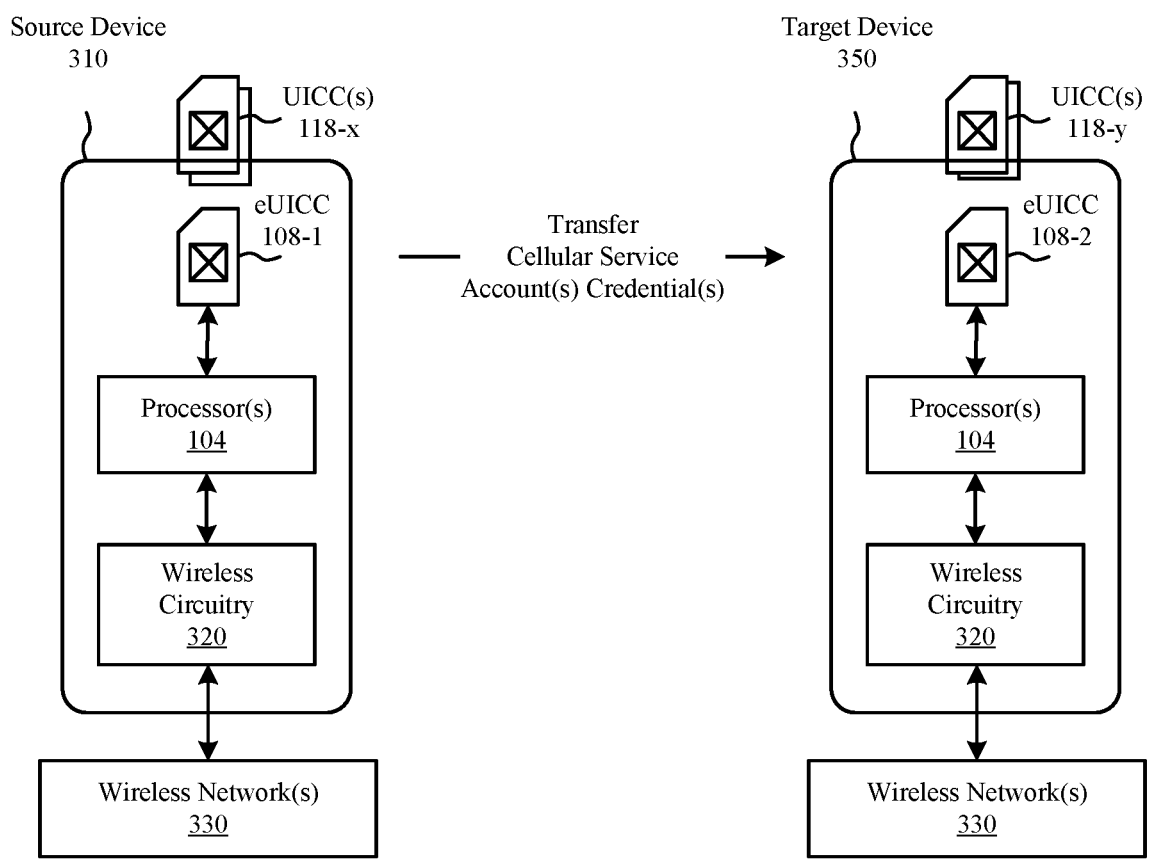
FIG. 3 illustrates a block diagram of an exemplary transfer of cellular service account credentials, such as a pSIM profile or an eSIM profile, from a source device to a target device, according to some embodiments.

FIG. 3 illustrates a block diagram 300 of an exemplary transfer of pSIM and/or eSIM credentials from a source device 310 to a target device 350. The source device 310 can provide information to the target device 350 to present, via respective user interfaces, information to assist a user in transferring one or more eSIMs 208 from an eUICC 108-1 of the source device 310 to an eUICC 108-2 of the target device 350 and/or converting one or more pSIMs on UICCs 118-x of the source device to eSIMs 208 on the eUICC 108-2 of the target device. Physical transfer of UICCs 118 is not considered herein. To confirm a user's intent to transfer a profile from the source device 310 to the target device 350, and to prevent malware from seeking to transfer a profile to an attacker's device (not shown) without knowledge of the user or against the user's intent, the source device 310 implements a procedure, as described herein, to obtain a secure intent gesture via a hardwired input of the source device 310 connected to a secure processing element, e.g., a secure enclave processor (SEP) 120. The SEP, after confirmation of the user's secure intent, adds an SEP signature to a message provided to the eUICC 108-1 of the source device 310, which verifies the signature using an SEP public key ($PK_{SEP}$) paired with the unique eUICC identifier (EID) of the eUICC 108-1 of the source device. The eUICC, after verification of the SEP signature, adds a verifiable eUICC signature to a message provided to an MNO entitlement server, which can release a transfer token to the source device 310 after verification of the eUICC signature and validation of data included in the message. Each of the source device 310 and the target device 350 include wireless circuitry 320 that can be used to communicate with one or more wireless networks 330. Transfer of a pSIM and/or eSIM credentials from the source device 310 to the target device 350 can allow the target device 350 to access cellular wireless services of one or more wireless networks 330.

Figure 4:
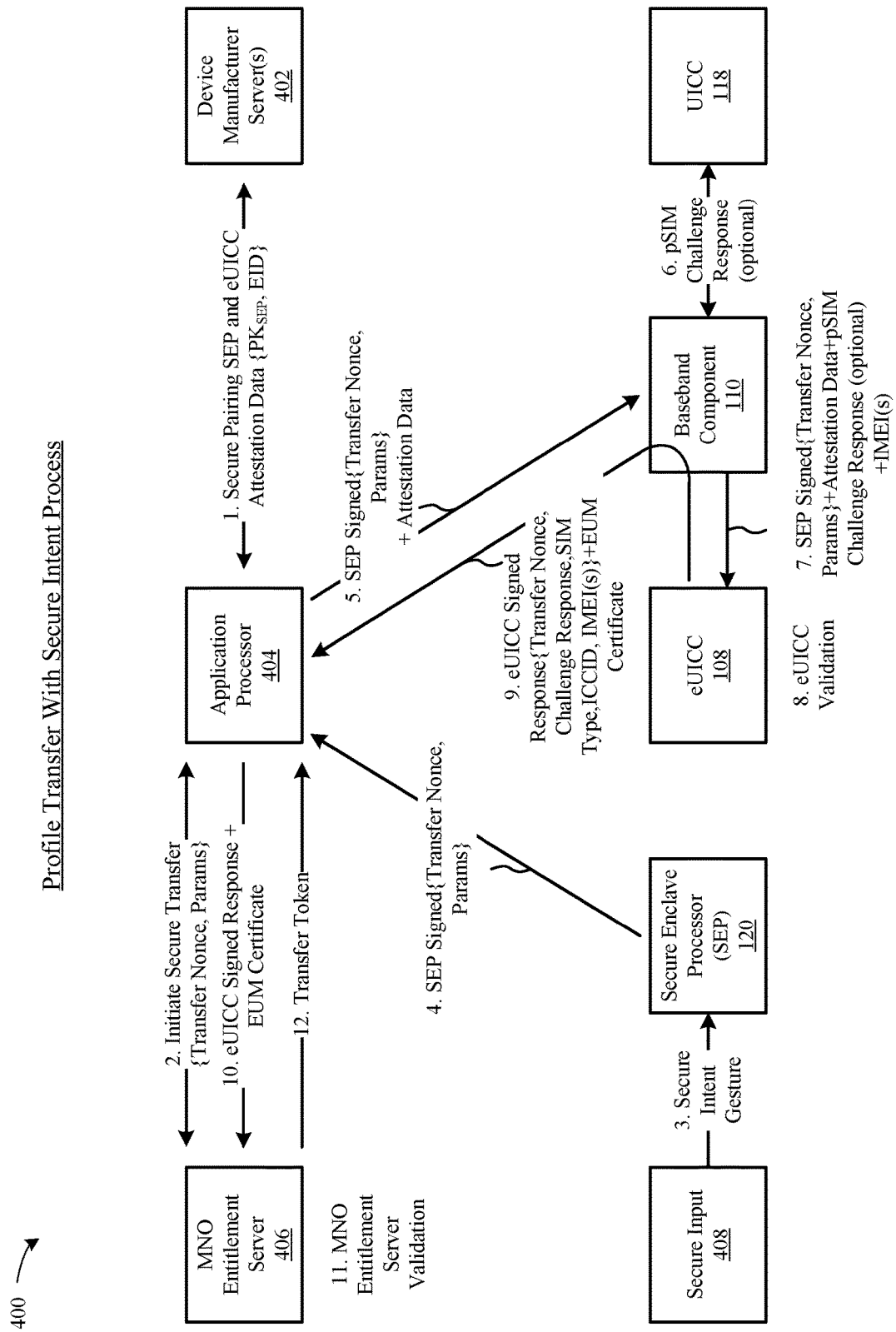
FIG. 4 illustrates a block diagram of an exemplary pSIM/eSIM profile transfer process with secure intent verification, according to some embodiments.

FIG. 4 illustrates a block diagram 400 of an exemplary pSIM/eSIM profile transfer process with secure intent verification, according to some embodiments. At a first step (1.), an application processor (AP) 404 of wireless device 102 exchanges communication with one or more device manufacturer servers 402 to securely pair together the SEP 120 and the eUICC 108 of the wireless device 102. The SEP 120 generates an asymmetric cryptographic key pair $\{PK_{SEP}, SK_{SEP}\}$ and provides the public key $PK_{SEP}$ with a unique device identifier, e.g., a hardware serial number, of the wireless device 102 to a first device manufacturer server 402 to embed in a basic attestation certificate returned to the wireless device 102. The AP 404 of the wireless device 102 subsequently presents the basic attestation certificate with an eUICC identifier (EID) value that uniquely identifies the eUICC 108 of the wireless device 102 to a second device manufacturer server 402, which confirms the EID value corresponds to the unique device identifier included in the basic attestation certificate and returns attestation data to the AP 404 of the wireless device 102. The attestation data includes the $PK_{SEP}$ and the EID value of the eUICC 108 of the wireless device. At a second step (2.), the AP 404 of the wireless device 102 sends a message to an MNO entitlement server 406 to initiate a secure transfer of a profile from the wireless device 102. The MNO entitlement server 406 generates a one-time use transfer nonce and returns the transfer nonce with authentication challenge parameters to the AP 404 of the wireless device 102. Exemplary authentication challenge parameters include an authentication token (AUTN) and a random number (RAND). The AP 404 of the wireless device 102 can present via a user interface (UI) a notification to a user of the wireless device 102 to input a secure intent gesture to confirm a user intent to transfer a profile. At a third step (3.), the SEP 120 receives the secure intent gesture via a secure input 408. In some embodiments, the secure input 408 includes a button of the wireless device 102 hardwired to the SEP 120 of the wireless device 102. In some embodiments, the secure intent gesture includes at least two sequential presses of the button of the wireless device 102. After detection of the secure intent gesture, at a fourth step (4.), the SEP 120 generates a signature using an SEP private key ($SK_{SEP}$) and attaches the signature to a message that includes the transfer nonce and the authentication challenge parameters. The message is sent from the SEP 120 to the AP 404, which forwards the message, at a fifth step (5.), along with attestation data previously received to a baseband component 110 of the wireless device 102. At an optional sixth step (6.), when the profile to be transferred is a physical SIM (pSIM), the baseband component 110 sends the authentication challenge parameters to the UICC 118 and receives from the UICC 118 authentication challenge response parameters. At a seventh step (7.), the baseband component 110 sends the SEP signed message, the attestation data, the pSIM authentication challenge parameters (for a pSIM transfer) and one or more unique hardware identifier values of the wireless device 102, e.g., international mobile equipment identifier (IMEI) values, to the eUICC 108 for validation. At an eighth step (8.), the eUICC 108 validates the SEP signature of the SEP signed message using the SEP public key $PK_{SEP}$ extracted from the attestation data. When the profile to be transferred is an eSIM 208, the eUICC 108 performs an AKA procedure to obtain eSIM authentication challenge response parameters. Upon successful validation of the SEP signature and successful authentication, the eUICC 108 generates an eUICC signature using an eUICC certificate chained to a root GSMA certificate trusted by the MNO entitlement server 406. At a ninth step (9.), the eUICC 108 generates an eUICC signed response message that includes the transfer nonce, the authentication challenge response parameters (pSIM or eSIM as applicable), a SIM type value indicating whether the transfer is for a pSIM or an eSIM 208, a unique identifier of the profile, e.g., an international circuit card identifier (ICCID) value, the one or more unique hardware identifier values of the wireless device 102, and the eUICC certificate (or an indication thereof) used for generating the eUICC signature. The eUICC 108 sends the eUICC signed response to the baseband component 110, which forwards the eUICC signed response message to the AP 404. At a tenth step (10.), the AP 404 forwards the eUICC signed response message and the eUICC certificate in a transfer authorization request message to the MNO entitlement server 406. At an eleventh step (11.), the MNO entitlement server 406 verifies the eUICC signature of the eUICC signed response message, validates information included therein, e.g., the transfer nonce matches the previously provided version, the authentication challenge responses are legitimate, the SIM type, unique hardware identifier values (e.g., IMEI values), unique profile identifier value (e.g., ICCID value) match corresponding account information maintained by the MNO 114. After validation is successful confirmation that the subscription supports transfer of the profile, the MNO entitlement server 406, at a twelfth step (12.), generates a transfer token and provides the transfer token to the AP 404 of the wireless device 102 to use for transfer of the profile from the wireless device 102, e.g., as a source device 310, to another wireless device 102, e.g., a target device 350.

Figure 5:
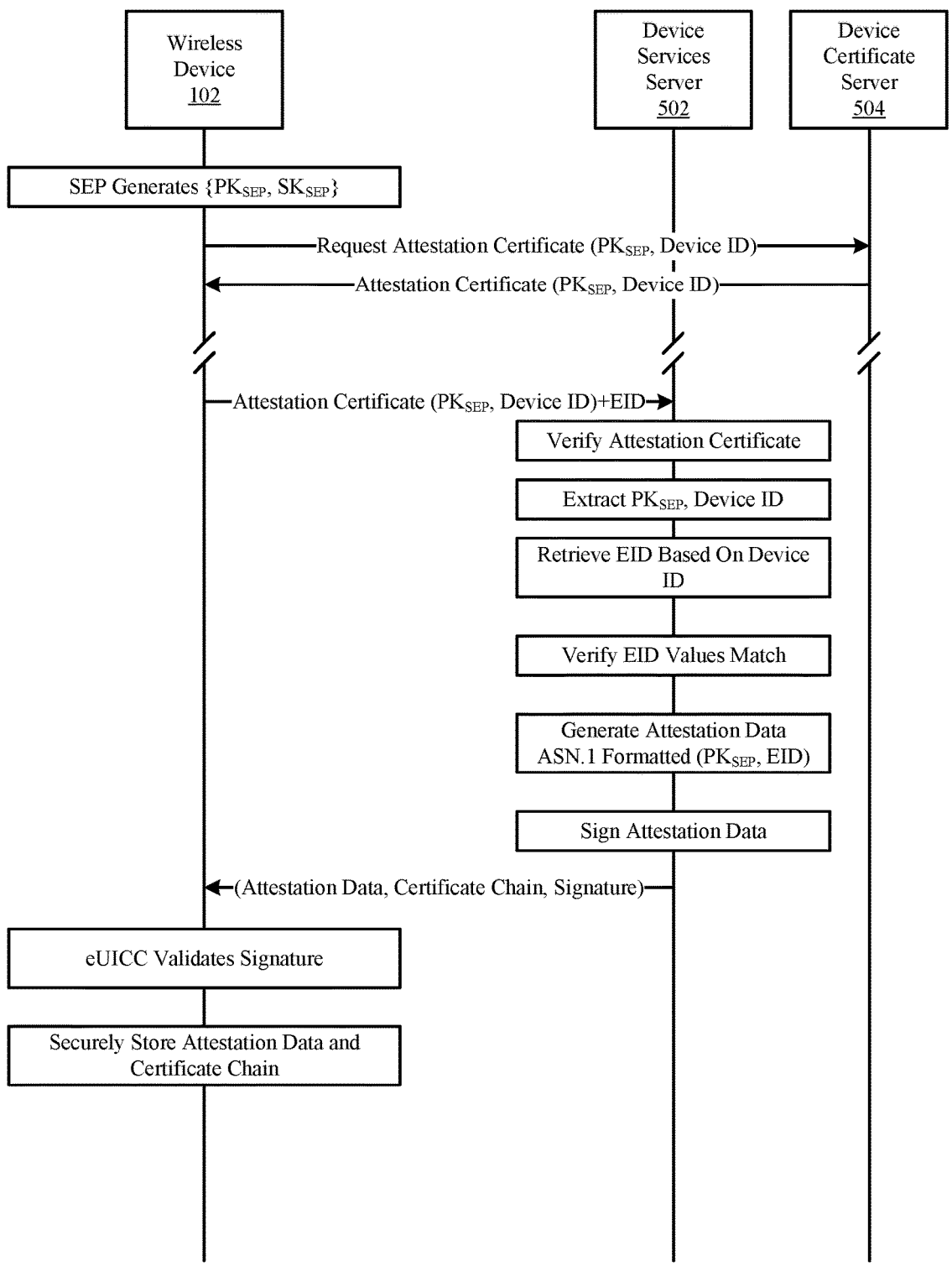
FIG. 5 illustrates a block diagram of an example of securely pairing together a secure enclave processor (SEP) and an eUICC of a wireless device, according to some embodiments.

FIG. 5 illustrates a diagram 500 of an example of securely pairing together an SEP 120 and an eUICC 108 of a wireless device 102. Initially, the SEP 120 generates an asymmetric cryptographic key pair $\{PK_{SEP}, SK_{SEP}\}$, which includes a public key $PK_{SEP}$ and a corresponding private (secret) key $SK_{SEP}$. The private key $SK_{SEP}$ can be used by the SEP to generate signatures for messages, where another entity can use the public key $PK_{SEP}$ to validate a signature accompanying a message from the SEP 120. To pair the SEP 120 with the eUICC 108, the wireless device 102 sends a message requesting an attestation certificate from a device certificate server 504. The request message includes the public key $PK_{SEP}$ and a unique hardware device identifier (ID) for the wireless device 102, e.g., the device ID can be a serial number for the wireless device 102. The device certificate server 504 returns to the wireless device 102 an attestation certificate that includes the public key $PK_{SEP}$ and the device ID embedded within. The wireless device 102 can store the attestation certificate received from the device certificate server 504 and at a later time use the attestation certificate to obtain attestation data from a separate device services server 502. In some embodiments, the wireless device 102 requests the attestation certificate from the device certificate server 504 at a random time, e.g., determined based on a randomly generated value, within a time period for updating multiple wireless devices 102, e.g., within a multiple-month time window. The random time and time period can be selected to limit loading on the device certificate server to less than a threshold maximum number of wireless devices 102 access thing the device certificate server 504 at the same time. The wireless device 102 sends the attestation certificate receive from the device certificate server 504 to a device services server 502 along with a unique identifier for the eUICC 108 of the wireless device 102, e.g., an eUICC identifier (EID) value for the eUICC 108. The device services server 502 verifies the attestation certificate using a previously pinned root certificate, and after verification, extracts the public key $PK_{SEP}$ and device ID from the attestation certificate. The device services server 502 retrieves an EID value that corresponds to the device ID value extracted from the attestation certificate and verifies that the retrieved EID value matches the EID value accompanying the attestation certificate received from the wireless device 102. When the EID values match, the devices services server 502 generates attestation data that includes the public key $PK_{SEP}$ and the EID value in an ASN.1 format, generates a signature for the attestation data, and returns to the wireless device 102 a message that includes the attestation data, a certificate chain, and the signature for the attestation data. The attestation data associates the public key $PK_{SEP}$ of the SEP 120 with the EID value of the eUICC 108, thereby securely pairing the SEP 120 and the eUICC 108 of the wireless device 102 together. The eUICC 108 of the wireless device 102 validates the signature, which has the corresponding public key to decrypt the signature. The wireless device 102 securely stores the attestation data and the accompanying certificate chain for future use. In some embodiments, the wireless device 102 stores the attestation data and the certificate chain in an encrypted local storage, such as used for passwords and other sensitive data on the wireless device 102. The eUICC 108 of the wireless device 102 can use the public key $PK_{SEP}$ to verify signatures of messages from the SEP 120, and malware on the AP 404 cannot fake such messages, as only the SEP 120 has the corresponding private key $SK_{SEP}$ used to generate signatures for messages. In some embodiments, pairing the SEP 120 and the eUICC 108 by associating together the public key $PK_{SEP}$ and the EID value of the eUICC 108 together is performed via a firmware update of the wireless device 102. In some embodiments, the wireless device 102 generates a random time period during which to perform the pairing, the random time period falling within an update window used for multiple wireless devices 102 already deployed in the field. In some embodiments, the random time period and update window are determined to ensure loading on the device services server 502 and/or the device certificate server 504 are kept below a threshold loading level. In some embodiments, the device services server 502 and the device certificate server 504 are maintained by a device manufacturer of the wireless device 102. In some embodiments, the wireless device 102 communicates with the device services server 502 at a randomly generated time within a time period to obtain the attestation data based on the attestation certificate, where the randomly generated time and time period are determined to limit loading on the device services server 502 to less than a threshold maximum number of wireless devices 102 simultaneously accessing the device services server 502.

Figure 6A:
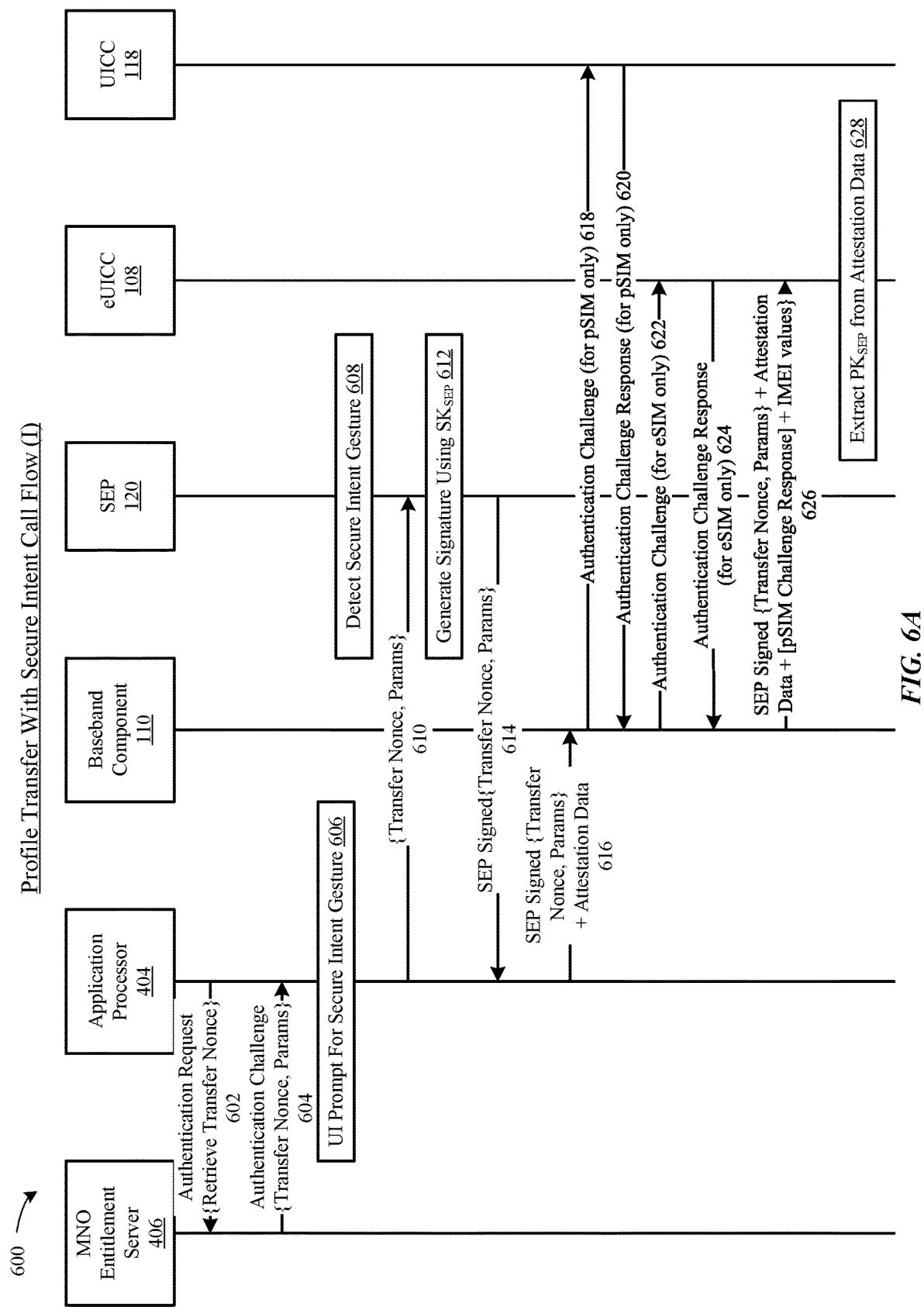
FIGS. 6A and 6B illustrate flow charts of an exemplary call flow to obtain securely a transfer token to transfer a pSIM/eSIM profile from a wireless device, according to some embodiments.
Figure 6B:
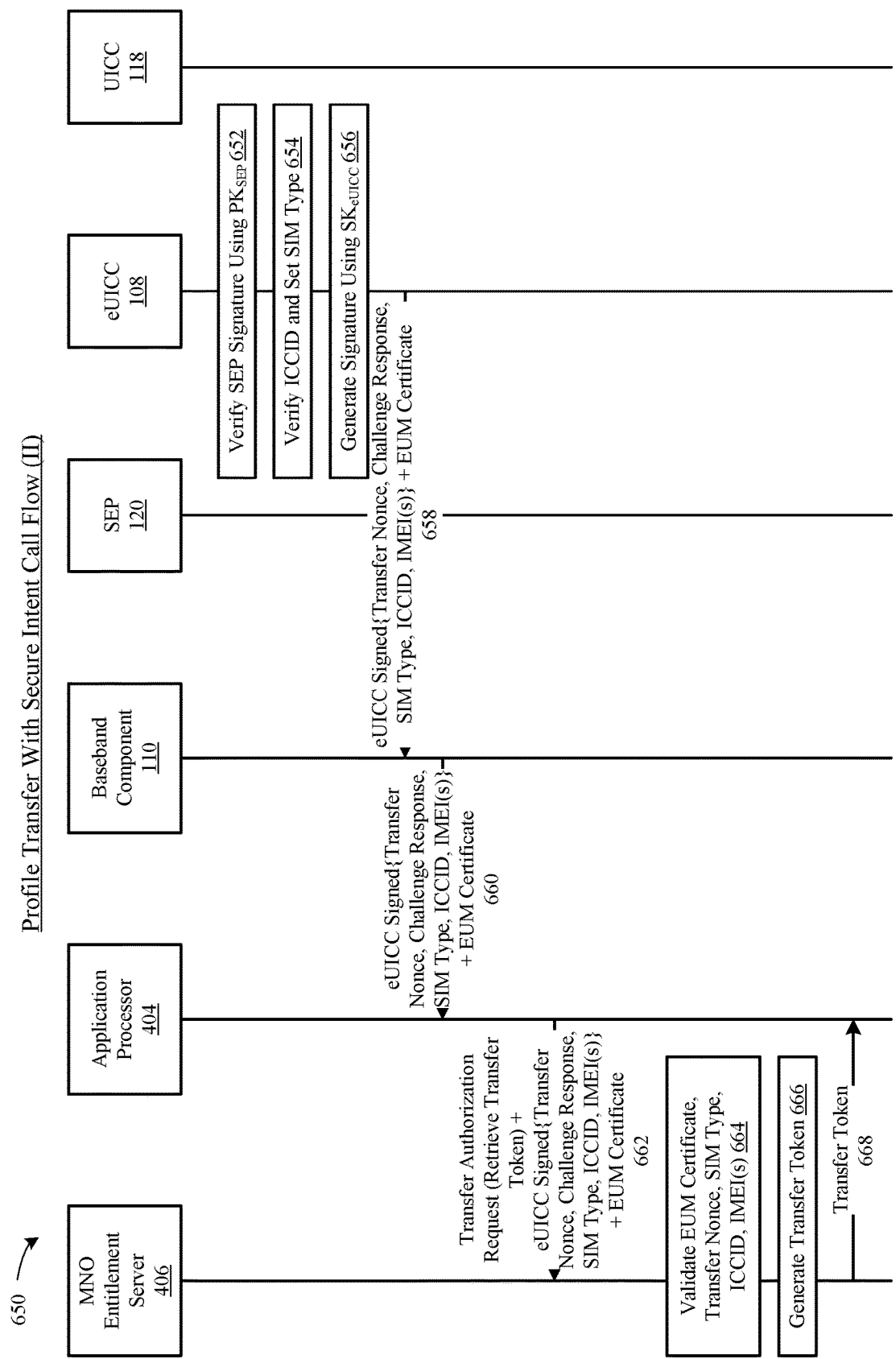

FIGS. 6A and 6B illustrate flow charts 600, 650 of an exemplary call flow to obtain a transfer token to transfer a profile for a wireless device 102 with confirmation via receipt of a secure intent gesture. At 602, an application processor (AP) 404 of the wireless device 102 sends an authentication request message to an MNO entitlement server 406, the authentication request message including an indication that the wireless device 102 seeks to obtain a transfer nonce from the MNO entitlement server 406. The authentication request message sent to the MNO entitlement server 406 does not include an EAP-AKA token. At 604, the MNO entitlement server 406 generates a transfer nonce and returns to the AP 404 of the wireless device 102 an authentication challenge message that includes the transfer nonce and authentication challenge parameters, e.g., AUTN and RAND values. At 606, the AP 404 presents a notification via a user interface (UI) of the wireless device 102 prompting a user to provide a secure intent gesture to indicate approval to transfer a profile from the wireless device 102. At 608, the SEP 120 of the wireless device 102 detects entry of the secure intent gesture. In some embodiments, the SEP 120 is directly hardwired to a physical input by which the secure intent gesture is entered by the user. In some embodiments, the physical input includes a physical button, and the secure intent gesture includes multiple, sequential presses of the physical button. In some embodiments, the secure intent gesture further includes additional secure inputs, such as a biometric sensor input and/or a passcode entry via a secure keyboard. At 610, the AP 404 sends a message to the SEP 120, the message requesting the SEP 120 generate a signature. The message includes the transfer nonce and the authentication challenge parameters and can further include a unique identifier for the profile to be transferred, e.g., an ICCID value of the profile. At 612, the SEP 120 generates the requested signature using a private key $SK_{SEP}$. At 614, the SEP 120 provides to the AP 404 the signed message that includes the transfer nonce, authentication challenge parameters, and ICCID value. The AP 404 forwards to the baseband component 110 the signed message along with the attestation data received and stored previously. When the profile to be transferred is a SIM on a UICC 118, i.e., a pSIM, the baseband component 110 obtains the authentication challenge response parameters for the pSIM transfer from the UICC 118 on which the pSIM resides. At 618, the baseband component sends the authentication challenge parameters for the pSIM transfer, e.g., AUTN and RAND, to the UICC 118. At 620, the UICC 118 returns to the baseband component 110 authentication challenge response parameters for the pSIM transfer determined by the UICC 118 based on the received authentication challenge parameters. When the profile to be transferred is an eSIM 208 on the eUICC 108 of the wireless device 102, the baseband component sends the authentication challenge parameters for the eSIM 208 transfer to the eUICC 108, at 622, and the eUICC 108, at 624 returns to the baseband component 110 authentication challenge response parameters for the eSIM 208 transfer determined by the eUICC 108 based on the received authentication challenge parameters. At 626, the baseband component 110 sends to the eUICC 108 the SEP signed message that includes the transfer nonce and authentication challenge parameters, the attestation data, one or more unique hardware identifier values for the wireless device, e.g., international mobile equipment identifier (IMEI) values, and for a pSIM transfer, the pSIM authentication challenge response parameters. In some embodiments, the eUICC 108 verifies a signature accompanying the attestation data, e.g., using a certificate chain derived from an eUICC sub-root certificate authority. At 628, after verification of the signature, the eUICC 108 extracts the public key $PK_{SEP}$ from the attestation data. At 652, the eUICC 108 verifies the SEP generated signature accompanying the message from the baseband component 110 using the public key $PK_{SEP}$ extracted from the attestation data. At 654, the eUICC 108 verifies the ICCID value of the profile to be transferred and determines a SIM type value (e.g., indicate whether the profile is a pSIM or eSIM 208) for the profile to be transferred. At 656, the eUICC 108 generates a signature using a private key $SK_{eUICC}$. At 658, the eUICC 108 returns an eUICC signed message that includes the transfer nonce, the authentication challenge response parameters, the determined SIM type value for the profile to be transferred, the ICCID value of the profile to be transferred, the one or more unique hardware identifier values of the wireless device 102, e.g., IMEI values, and an eUICC certificate. At 660, the baseband component 110 forwards the signed eUICC message and the eUICC certificate to the AP 404. At 662, the AP 404 sends a profile transfer authorization request to obtain a transfer token to transfer the profile and the eUICC signed message with the eUICC certificate to the MNO entitlement server 406. At 664, the MNO entitlement server 406 validates the eUICC certificate, confirms the transfer nonce value matches the previously provided value, validates the SIM type value corresponds to the ICCID value for the profile to transfer, and verifies the unique hardware identifier values of the wireless device 102, e.g., IMEI values, are correct. The MNO entitlement server 406 can perform additional checks (not shown) to ensure that the profile is allowed to be transferred, e.g., based on a subscription policy. At 666, the MNO entitlement server 406, after successful validation, generates a transfer token, and at 668, the MNO entitlement server 406 provides the transfer token to the AP 404 of the wireless device 102 to use for transfer of the profile.

Figure 7A:
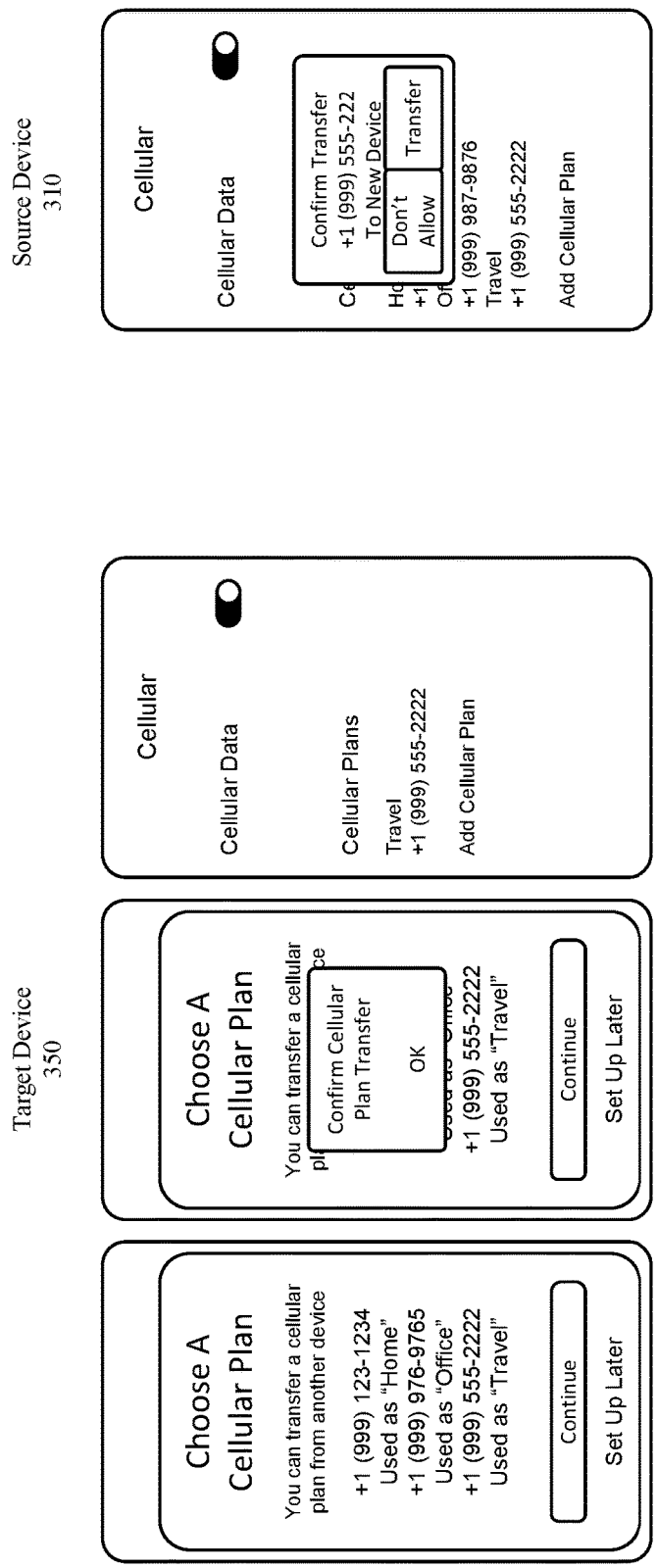
FIG. 7A illustrates an exemplary user interface (UI) for a pSIM/eSIM profile transfer from a source device to a target device without secure intent verification, according to some embodiments.

FIG. 7A illustrates a diagram 700 of an exemplary user interface (UI) for a profile transfer from a source device 310 to a target device 350 without secure intent verification. A list of profiles (cellular plans) that may be transferrable from the source device 310 to the target device 350 can be presented via a UI to a user of the target device 350 from which to select one or more profiles to transfer. After selection of a profile to transfer, a prompt can be presented via the UI of the target device 350 requesting confirmation of the request to transfer the profile. At the source device 310, a notification can be presented that requests a user of the source device 310 to confirm whether the selected profile can be transferred to the target device 350. The notification includes an option to confirm the transfer, which can result in the cellular plan being transferred to the target device 350. The notification also includes an option to disallow the transfer of the profile. Although the notification includes the option to disallow the transfer, in a source device 310 that is compromised, e.g., by malicious software on the AP 404 of the source device 310, the notification message could be suppressed and allow the transfer of the profile to occur without knowledge or consent of the user of the source device 310. In some cases, the transfer could occur in the background without the source device 310 being aware of the transfer or knowing the identity of the target device 350. As such, additional security protection that requires a secure user intent gesture to be detected, as described herein, can thwart an attempt to transfer a profile surreptitiously.

Figure 7B:
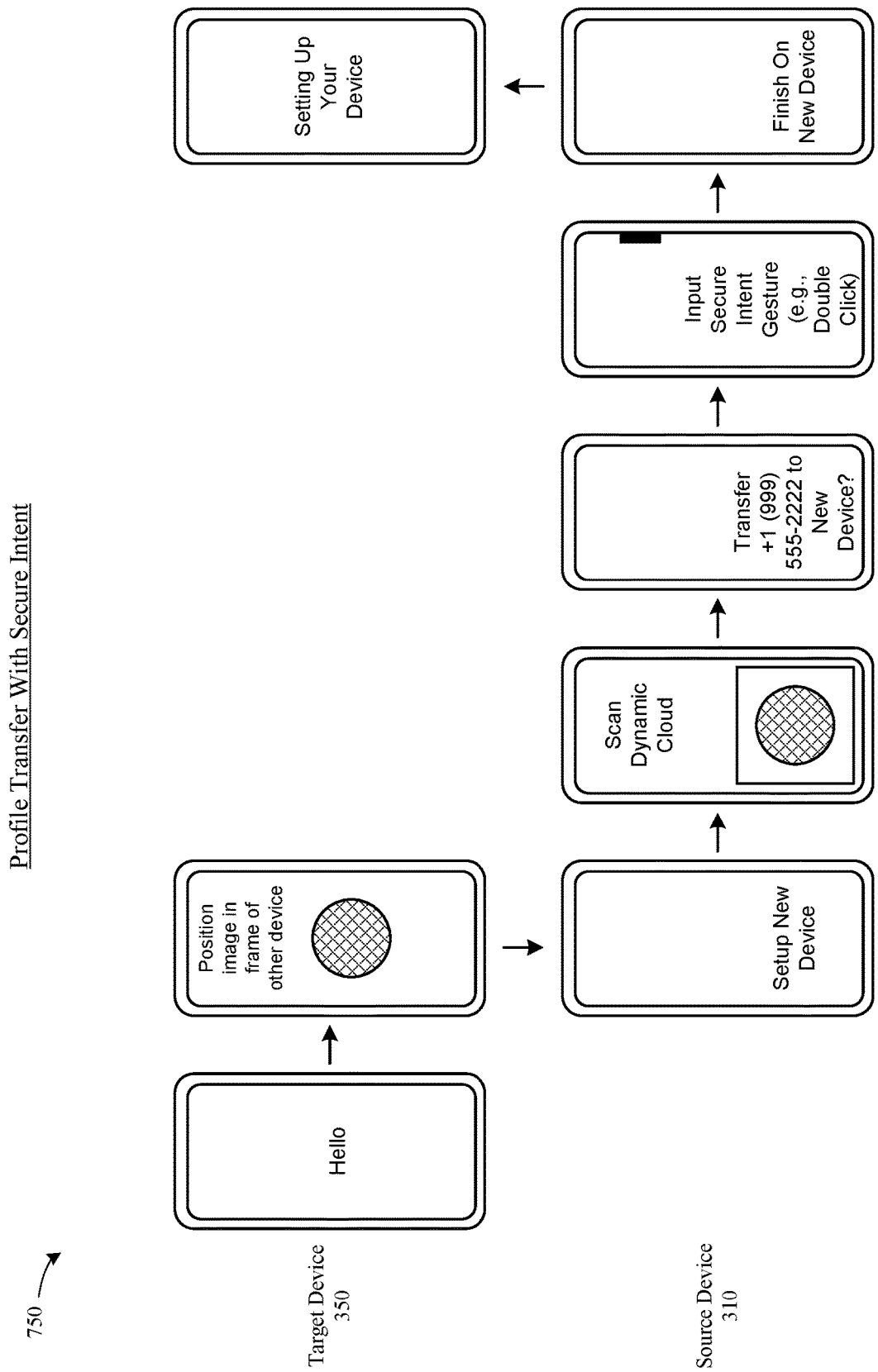
FIG. 7B illustrates an example of a UI for a pSIM/eSIM profile transfer from a source device to a target device with secure intent verification, according to some embodiments.

FIG. 7B illustrates an diagram 750 of an exemplary UI for a profile transfer from a source device 310 to a target device 350 with secure intent verification at the source device 310. In the example illustrated in FIG. 7B, transfer of the profile occurs in conjunction with setting up the target device 350; however, the secure intent notification and requirement to detect a corresponding secure intent gesture can be used for transfer of a profile after initial set up of the target device 350 has already occurred. A notification regarding an option to transfer one or more profiles (one profile being shown here) can be presented to a user of the source device 310, and when the user indicates to transfer the profile, a notification is presented via the UI of the source device 310 requiring the user to input a secure intent gesture via a secure hardware input of the source device 310. In some embodiments, the secure intent gesture includes multiple, sequential presses of a physical button, e.g., a double click gesture. In some embodiments, additional security inputs can be required to authorize transfer of the profile at the source device 310, such as entry of a passcode, a biometric sensor input and validation, or repeated entry of secure intent gestures (e.g., double click two separate times). After receipt and verification of the secure intent gesture, transfer of the profile from the source device 310 to the target device 350 can proceed.

Figure 8:
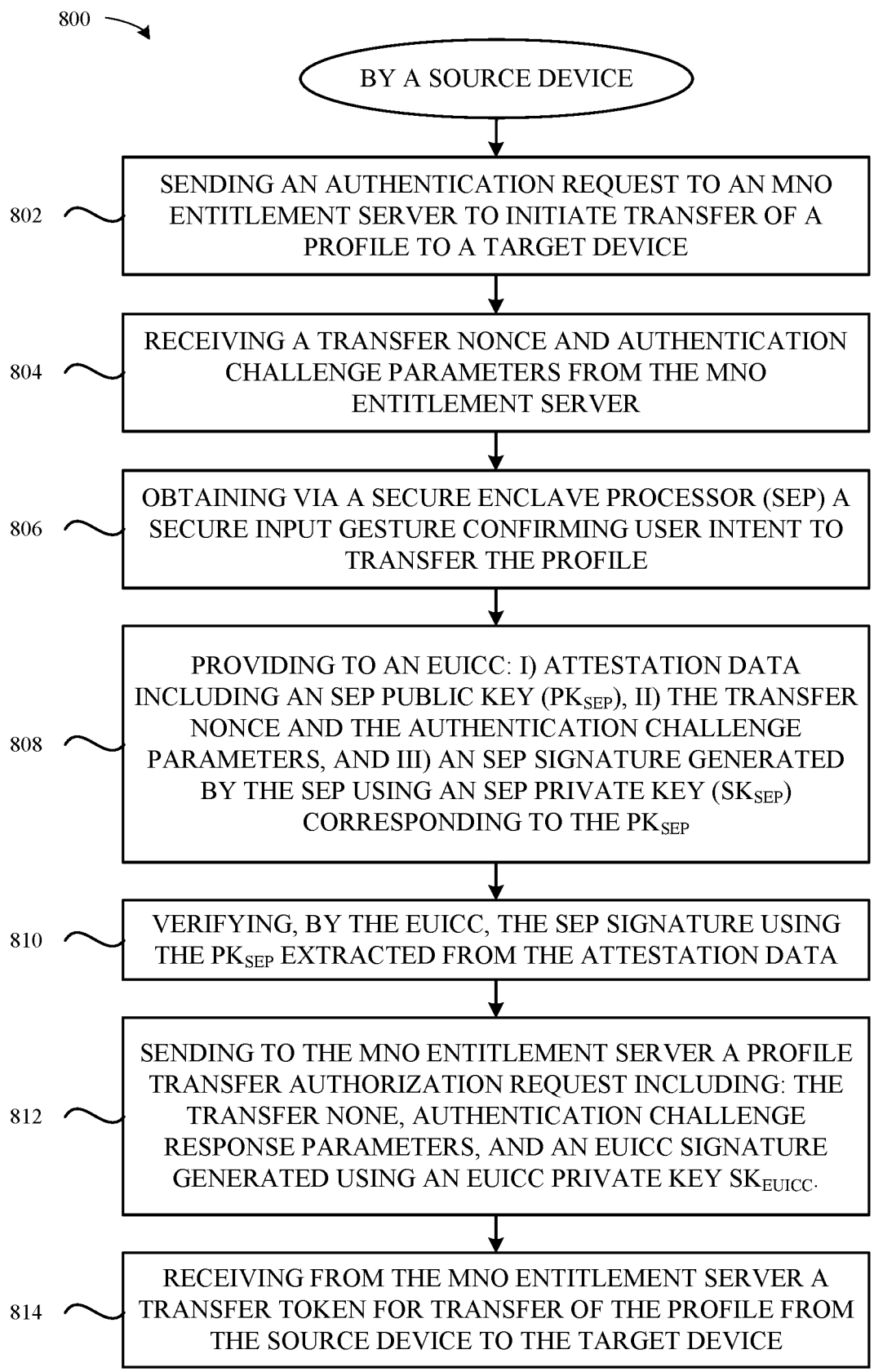
FIG. 8 illustrates a flow chart of an exemplary method to obtain a transfer token with secure intent verification by a source device, according to some embodiments.

FIG. 8 illustrates a flowchart 800 of an exemplary method performed by a source device 310 to obtain a transfer token authorizing transfer of a profile from the source device 310 to a target device 350. At 802, an application processor (AP) 404 of the source device 310 sends to an MNO entitlement server 406 an authentication request message to initiate transfer of the profile, e.g., an eSIM 208 or a pSIM, from the source device 310 to the target device 350. At 804, the AP 404 of the source device 310 receives from the MNO entitlement server 406 a reply message that includes a one-time user transfer nonce and an one or more authentication challenge parameters. At 806, a secure enclave processor (SEP) 120 of the source device 310 obtains a secure intent gesture confirming user intent to transfer the profile. At 808, an eUICC 108 of the source device 310 receives a set of data for verification, the set of data including: i) attestation data that includes an SEP public key ($PK_{SEP}$), ii) the transfer nonce and the authentication challenge parameters, and iii) an SEP signature generated by the SEP 120 using an SEP private key ($SK_{SEP}$) that corresponds to the SEP public key $PK_{SEP}$. Transfer of the set of data to the eUICC 108 can be contingent on successful receipt and verification of the secure intent gesture by the SEP 120. At 810, the eUICC 108 of the source device 310 verifies the SEP signature using the SEP public key $PK_{SEP}$ extracted from the attestation data. At 812, responsive to verification of the SEP signature by the eUICC 108, the AP 404 of the source device 310 sends to the MNO entitlement server 406 a profile transfer authorization request that includes: i) the transfer nonce, ii) authentication challenge response parameters, and iii) an eUICC signature generated by the eUICC 108 using an eUICC private key ($SK_{eUICC}$). At 814, the AP 404 of the source device 310 receives from the MNO entitlement server 406 a transfer token to use for transfer of the profile from the source device 310 to the target device 350.

In some embodiments, the attestation data includes, in addition to the SEP public key $PK_{SEP}$, an eUICC identifier (EID) value of the eUICC 108 of the source device 310 binding the $PK_{SEP}$ together with the EID value. In some embodiments, the method performed by the source device 310 further includes the source device 310 sending, to a device services server 502: i) an attestation certificate that includes the SEP public key $PK_{SEP}$ and a unique hardware identifier for the source device 310, and ii) the EID value of the eUICC of the source device 310. In some embodiments, the method performed by the source device 310 further includes the source device 310 receiving, from the device services server 502, after confirmation that the EID value corresponds to the eUICC 108 of the source device 310 identified by the unique hardware device identifier, i) the attestation data, and ii) a certificate chain relating an eUICC certificate to a trusted root certificate. In some embodiments, the unique hardware device identifier for the source device 310 includes a hardware serial number of the source device 310. In some embodiments, the profile transfer authorization request includes a SIM type indicating whether the profile to transfer is a pSIM on a UICC 118 of the source device 310 or an eSIM 208 on the eUICC 108 of the source device 310. In some embodiments, when the SIM type indicates the profile to transfer is a pSIM on the UICC 118 of the source device 310, the method performed by the source device 310 further includes: i) obtaining, by a baseband component 110 of the source device 310 from the UICC 118, at least a portion of the authentication challenge response parameters, and ii) providing, by the baseband component 110 to the eUICC 108, the at least a portion of the authentication challenge response parameters to include in the profile transfer authorization request. In some embodiments, when the SIM type indicates the profile to transfer is an eSIM 208 on the eUICC 108 of the source device 310, the method performed by the source device 310 further includes the eUICC 108 generating at least a portion of the authentication challenge response parameters to include in the profile transfer authorization request. In some embodiments, the secure intent gesture includes an action received via a hardware-based input of the source device 310 hardwired to the SEP 110. In some embodiments, the hardware-based input includes a physical button. In some embodiments, the action includes at least two sequential presses of the physical button. In some embodiments, the profile transfer authorization request includes an eUICC certificate for the MNO entitlement server 406 to use for validation of the profile transfer authorization request. In some embodiments, the method further includes the source device 310 providing to the target device 350 the transfer token to allow the target device 350 to indicate authorization to download the profile to be transferred.

In some embodiments, a transfer flow type for transfer of the profile is determined prior to initiating transfer of the profile with the MNO entitlement server from the source device 310. Exemplary transfer flow types can include i) a one-click transfer flow that allows for transfer of the profile without interaction with an MNO web-sheet server and ii) a web-sheet transfer flow that requires interaction via the source device 310 with an MNO web-sheet server to effect the transfer. When the transfer flow type is determined to be a web-sheet transfer flow, acquisition of a secure intent gesture can be optional. In some embodiments, interaction with the MNO web-sheet server can provide an indication of user intent to transfer the profile. In some embodiments, a secure intent gesture can be required in addition to interaction with the MNO web-sheet server to increase security further.

In some embodiments, a user can seek to transfer multiple profiles, e.g., a combination of an eSIM 208 and a pSIM, two pSIMs, two eSIMs 208, or any combination of eSIMs 208 and pSIMs from the source device 310 to the target device 350. In some embodiments, the source device 310 can communicate with one or more MNO entitlement servers 406 in parallel to obtain multiple transfer tokens for transfer of multiple profiles from the source device 310 to the target device 350. In some embodiments, a single secure intent gesture can be used to indicate user intent to transfer multiple profiles from the source device 310 to the target device 350. In some embodiments, a single secure intent gesture can be used to indicate intent to transfer up to a maximum number of profiles, e.g., up to five distinct profiles, from the source device 310 to the target device 350.

Representative Exemplary Apparatus

Figure 9:
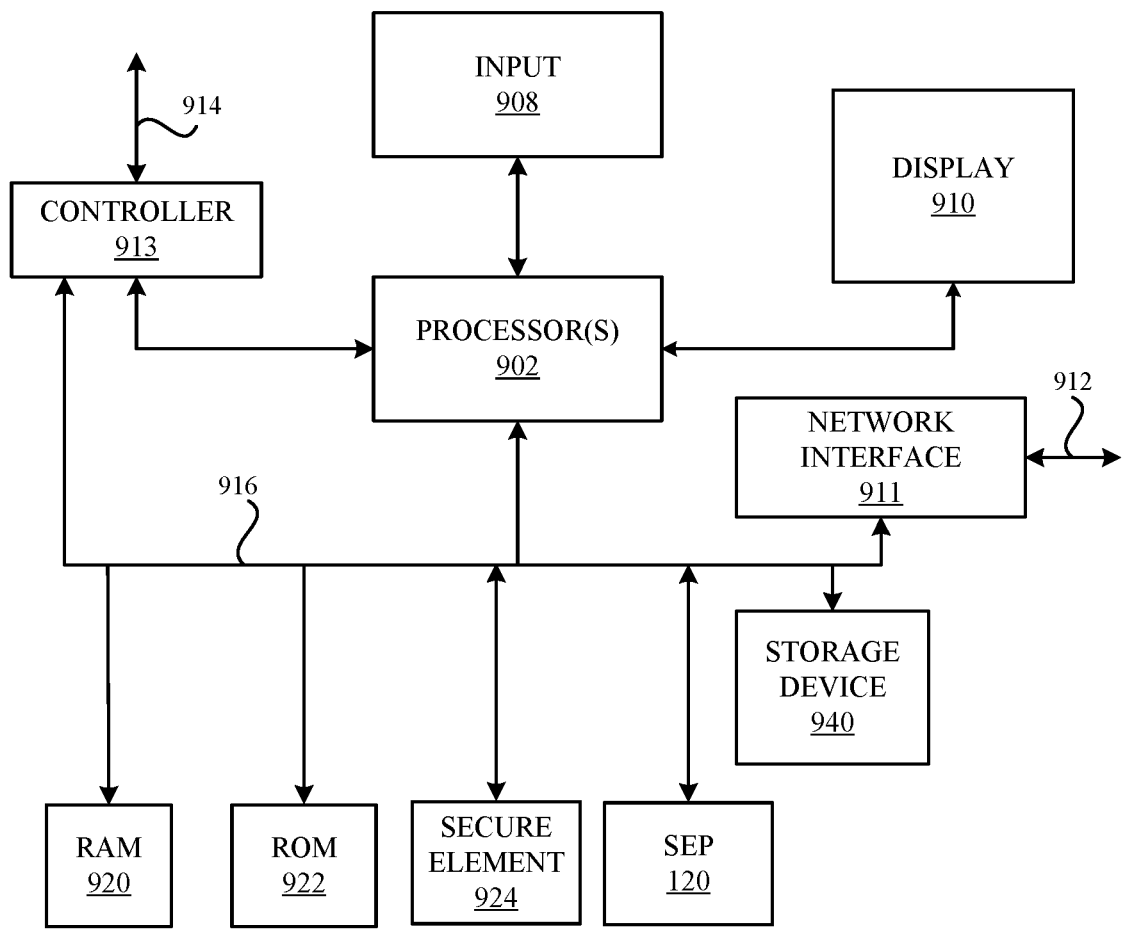
FIG. 9 illustrates a block diagram of exemplary elements of a wireless device, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the wireless device 102. As shown in FIG. 9, the computing device 900 can include one or more processors 902 that represent microprocessors or controllers for controlling the overall operation of computing device 900. In some embodiments, the computing device 900 can also include a user input device 908 that allows a user of the computing device 900 to interact with the computing device 900. For example, in some embodiments, the user input device 908 can take a variety of forms, such as a button, keypad, dial, touch screen, audio input interface, visual/image capture input interface, input in the form of sensor data, etc. In some embodiments, the computing device 900 can include a display 910 (screen display) that can be controlled by the processor(s) 902 to display information to the user (for example, information relating to incoming, outgoing, or active communication sessions). A data bus 916 can facilitate data transfer between at least a storage device 940, the processor(s) 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband component 110. The computing device 900 can also include a secure element 924. The secure element 924 can include an eUICC 108 and/or a UICC 118. The computing device 900 can also include a secure enclave processor (SEP) 120.

The computing device 900 also includes a storage device 940, which can include a single storage or a plurality of storages (e.g., hard drives and/or solid-state drives), and includes a storage management module that manages one or more partitions within the storage device 940. In some embodiments, storage device 940 can include flash memory, semiconductor (solid state) memory or the like. The computing device 900 can also include a Random-Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different radio access technologies (RATs). In these scenarios, a multi-mode user equipment (UE) can be configured to prefer attachment to a 5G wireless network offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method performed by a source device to obtain a transfer token with secure intent confirmation to transfer a profile to a target device, the method comprising:
responsive to receipt of a secure intent gesture, providing, to an embedded universal integrated circuit card (eUICC) of the source device:
attestation data including a secure enclave processor (SEP) public key ($PK_{SEP}$),
a transfer nonce and authentication challenge parameters, and
a SEP signature generated by the SEP using a SEP private key ($SK_{SEP}$) corresponding to the $PK_{SEP}$;
verifying, by the eUICC, the SEP signature using the $PK_{SEP}$ extracted from the attestation data;
responsive to verification of the SEP signature by the eUICC, sending to a mobile network operator (MNO) entitlement server, a profile transfer authorization request including:
the transfer nonce,
authentication challenge response parameters, and
an eUICC signature generated by the eUICC using an eUICC private key ($SK_{eUICC}$); and
receiving, from the MNO entitlement server, the transfer token for transfer of the profile to the target device.

2. The method of claim 1, further comprising:
sending, by an application processor (AP) to the MNO entitlement server associated with the profile, an authentication request to initiate transfer of the profile;
receiving, by the AP from the MNO entitlement server, the transfer nonce and the authentication challenge parameters; and
obtaining, via the SEP, the secure intent gesture confirming user intent to transfer the profile.

3. The method of claim 1, wherein the attestation data further includes an eUICC identifier (EID) value of the eUICC of the source device binding the $PK_{SEP}$ together with the EID value.

4. The method of claim 3, further comprising:
sending, to a device services server, i) an attestation certificate including the $PK_{SEP}$ and a unique hardware device identifier for the source device, and ii) the EID value; and
receiving, from the device services server after confirmation that the EID value corresponds to the eUICC of the source device identified by the unique hardware device identifier, i) the attestation data and ii) a certificate chain relating an eUICC certificate to a trusted root certificate.

5. The method of claim 4, wherein the unique hardware device identifier for the source device comprises a hardware serial number of the source device.

6. The method of claim 1, wherein the profile transfer authorization request includes a subscriber identity module (SIM) type indicating whether the profile to transfer is a physical SIM (pSIM) on a universal integrated circuit card (UICC) of the source device or an electronic SIM (eSIM) on the eUICC of the source device.

7. The method of claim 6, wherein, when the SIM type indicates a pSIM, the method further comprises:
obtaining, by a baseband component of the source device from the UICC, at least a portion of the authentication challenge response parameters; and
providing, by the baseband component to the eUICC, the at least a portion of the authentication challenge response parameters to include in the profile transfer authorization request.

8. The method of claim 6, wherein, when the SIM type indicates an eSIM, the method further includes:
generating, but the eUICC, at least a portion of the authentication challenge response parameters to include in the profile transfer authorization request.

9. The method of claim 1, wherein the secure intent gesture comprises an action received via a hardware-based input of the source device hardwired to the SEP.

10. The method of claim 9, wherein:
the hardware-based input comprises a physical button; and
the action comprises at least two sequential presses of the physical button.

11. The method of claim 1, wherein the profile transfer authorization request further includes an eUICC certificate for the MNO entitlement server to use for validation of the profile transfer authorization request.

12. The method of claim 1, further comprising:
providing, by the source device to the target device, the transfer token to allow the target device to indicate authorization to download the profile to be transferred.

13. A source device configured to transfer a profile to a target device, the source device comprising:
wireless circuitry including one or more antennas, and
processing circuitry communicatively couple to the wireless circuitry, the processing circuitry comprising an application processor (AP), a baseband component, a secure enclave processor (SEP), an embedded universal integrated circuit card (eUICC), and at least one storage element storing instructions that when executed by the processing circuitry cause the source device to perform actions including:
responsive to receipt of a secure intent gesture, providing, to the eUICC:
attestation data including a SEP public key ($PK_{SEP}$),
a transfer nonce and authentication challenge parameters, and
a SEP signature generated by the SEP using a SEP private key ($SK_{SEP}$) corresponding to the $PK_{SEP}$;
verifying, by the eUICC, the SEP signature using the $PK_{SEP}$ extracted from the attestation data;
responsive to verification of the SEP signature by the eUICC, sending to a mobile network operator (MNO) entitlement server, a profile transfer authorization request including:
the transfer nonce,
authentication challenge response parameters, and
an eUICC signature generated by the eUICC using an eUICC private key ($SK_{eUICC}$); and
receiving, from the MNO entitlement server, a transfer token for transfer of the profile to the target device.

14. The source device of claim 13, wherein execution of the instructions further cause the source device to perform additional actions including:
sending, by the AP to a mobile network operator (MNO) entitlement server associated with the profile, an authentication request to initiate transfer of the profile;

receiving, by the AP from the MNO entitlement server, a transfer nonce and authentication challenge parameters; and obtaining, via the SEP, a secure intent gesture confirming user intent to transfer the profile.

15. The source device of claim 13 wherein the attestation data further includes an eUICC identifier (EID) value of the eUICC of the source device binding the $PK_{SEP}$ together with the EID value.

16. The source device of claim 13, wherein execution of the instructions further cause the source device to perform additional actions including:

sending, to a device services server, i) an attestation certificate including the $PK_{SEP}$ and a unique hardware device identifier for the source device, and ii) the EID value; and receiving, from the device services server after confirmation that the EID value corresponds to the eUICC of the source device identified by the unique hardware device identifier, i) the attestation data and ii) a certificate.

17. The source device of claim 13, wherein the profile transfer authorization request includes a subscriber identity module (SIM) type indicating whether the profile to transfer is a physical SIM (pSIM) on a universal integrated circuit card (UICC) of the source device or an electronic SIM (eSIM) on the eUICC of the source device.

18. The source device of claim 17, wherein, when the SIM type indicates a pSIM, execution of the instructions further cause the source device to perform additional actions including:

obtaining, by the baseband component of the source device from the UICC, at least a portion of the authentication challenge response parameters; and providing, by the baseband component to the eUICC, the at least a portion of the authentication challenge response parameters to include in the profile transfer authorization request.

19. The source device of claim 13, further comprising:
a hardware-based input hardwired to the SEP,
wherein:
the secure intent gesture comprises an action received via the hardware-based input;
the hardware-based input comprises a physical button; and
the action comprises at least two sequential presses of the physical button.

20. A non-transitory computer-readable medium storing instructions that, when executed by one or more processors of a source device, cause the source device to perform actions to transfer a profile to a target device, the actions comprising:

responsive to receipt of a secure intent gesture, providing, to an embedded universal integrated circuit card (eUICC) of the source device:

attestation data including a secure enclave processor (SEP) public key ($PK_{SEP}$), a transfer nonce and authentication challenge parameters, and a SEP signature generated by the SEP using a SEP private key ($SK_{SEP}$) corresponding to the $PK_{SEP}$;

verifying, by the eUICC, the SEP signature using the $PK_{SEP}$ extracted from the attestation data;

responsive to verification of the SEP signature by the eUICC, sending to a mobile network operator (MNO) entitlement server, a profile transfer authorization request including:

the transfer nonce, authentication challenge response parameters, and an eUICC signature generated by the eUICC using an eUICC private key ($SK_{eUICC}$); and receiving, from the MNO entitlement server, a transfer token for transfer of the profile to the target device.

\* \* \* \* \*